Figure 1:
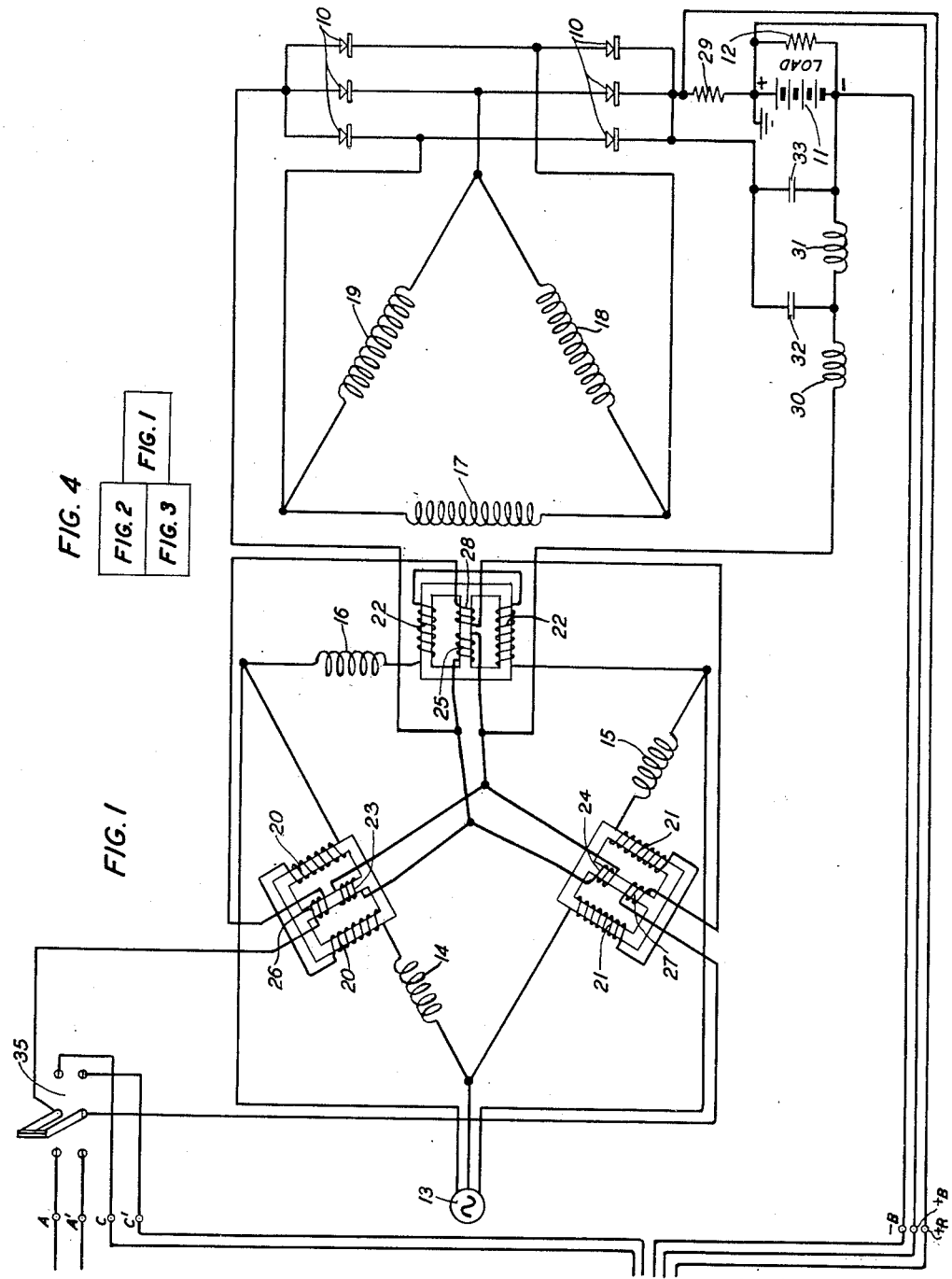

Feb. 10, 1953 J. A. POTTER 2,628,340
VOLTAGE AND CURRENT REGULATION
Filed July 29, 1947 3 Sheets-Sheet 1

INVENTOR
J. A. POTTER
BY
G. F. Heuerman
ATTORNEY

INVENTOR
J. A. POTTER
BY
G. F. Heuerman
ATTORNEY

Feb. 10, 1953  J. A. POTTER  2,628,340
VOLTAGE AND CURRENT REGULATION
Filed July 29, 1947  3 Sheets-Sheet 3

INVENTOR
J.A. POTTER
BY
G. F. Heuerman
ATTORNEY

Patented Feb. 10, 1953

2,628,340

UNITED STATES PATENT OFFICE 2,628,340

VOLTAGE AND CURRENT REGULATION

James A. Potter, Rutherford, N. J., assignor to Bell Telephone Laboratories, Incorporated, New York, N. Y., a corporation of New York Application July 29, 1947, Serial No. 764,490

11 Claims. (Cl. 321—19)

This invention relates to current and voltage regulation and particularly to regulated rectifying apparatus for supplying direct current to a load circuit comprising a battery connected across a load.

An object of the invention is to provide improved apparatus for minimizing voltage changes across a load to which current is supplied from a current source.

Another object is to provide apparatus for regulating the current supplied to a load to minimize load voltage changes and, when the current required for constant load voltage is excessive, for regulating the current supplied to the load to minimize load current changes.

A further object is to provide apparatus responsive to the relative magnitudes of a first and a second space current for controlling a third space current in accordance with the amplitude of one only of said first and second space currents.

Another object is to provide apparatus for controlling the current supplied to a load under control of a charge on a condenser which is changed in one direction when the load voltage is greater than an upper limiting value and in the opposite direction when the load voltage is less than a lower limiting value.

Another object is to provide for controlling a voltage responsive device improved apparatus comprising a plurality of resistors and a plurality of varistors.

In a specific illustrative embodiment of the invention herein shown and described, there is provided a three-phase bridge rectifier to which current from a three-phase alternating current source is supplied through transformers for supplying direct current to a load circuit comprising a battery. The secondary transformer windings are delta-connected and the primary windings are connected in paths respectively which are delta-connected. Three saturable reactors are connected in series with the primary windings respectively, the reactances of the saturable reactors being varied under control of current supplied to saturating windings of the saturable reactors to control the voltages across the transformers, respectively, and thereby the rectified current supplied to the load circuit. Current is supplied to the saturating windings from an auxiliary rectifier through the space current path of a space current device or series regulator tube. The resistance of the space current path of the series regulator tube is controlled by controlling the potential of its control electrode with respect to its cathode potential to thereby control the current supplied to the saturating windings.

In one of two alternative arrangements for controlling the current supplied to the saturating windings of the saturable reactors, a condenser connected in the control grid-cathode circuit of a series regulator tube is quickly charged from a direct current source when the circuit is started in operation to maintain at a low amplitude the current supplied from a space current rectifier to the saturating windings so as to avoid damaging the filamentary cathode of the rectifier tube during an initial period while it is being heated to operating temperature. When the rectifier tube cathode has been heated sufficiently, the rectifier supplies energizing current to a starting relay which operates to open the condenser charging circuit. There are provided a second relay which is operated when the battery voltage is sufficiently low to complete a high time constant discharge current circuit for the condenser and a third relay which is operated when the battery voltage is sufficiently high to complete a high time constant charging current circuit for the condenser. The current supplied through the series regulator tube to the saturating windings is thus increased or decreased due to the change of charge on the condenser. While the second and third relays are unactuated, the charge on the condenser will remain nearly constant for a long period to cause the battery to be charged at a nearly constant rate, the condenser being discharged very slowly due only to leakage resistance. An excessive battery charging current causes the operation of a fourth relay which completes an energizing circuit for the second relay thereby causing the condenser to be charged to effect a lowering of the battery charging rate.

In the second alternative arrangement for controlling the series regulator tube, there are provided two amplifiers having a common output stage. The one amplifier is controlled in response to battery voltage changes to set up a control voltage for a series regulator tube for causing voltage changes across the battery and load to be minimized. The other amplifier is controlled in response to changes of current supplied from the battery charging rectifier to the battery and the load connected across it to set up a control voltage for the series regulator tube for causing the battery charging rectifier to supply current at a preselected, substantially constant rate. Means are provided for automatically making effective for controlling the battery charging current either the voltage regulating amplifier or the current regulating amplifier whichever at the time requires the smaller current to be supplied by the battery charging rectifier. This means comprises a unidirectional voltage source and in series therewith two parallel branch paths, the one branch path comprising an asymmetrical varistor and in series therewith a portion of the space current circuit of a space current tube in the voltage regulating amplifier and the other branch path comprising an asymmetrical varistor and in series therewith a portion of the space current circuit of a space current tube in the current regulating amplifier. One of the varistors is thus made conducting to cause the completion of a circuit from either the voltage regulating amplifier or the current regulating amplifier to the final amplifier stage. Thus, when excessive current is being supplied by the battery charging rectifier under control of the voltage regulating amplifier, the voltage regulating amplifier is disconnected from the final amplifier stage and the current regulating amplifier is connected to the final amplifier stage to cause the battery charging rectifier to supply a preselected constant current. When, subsequently, the battery voltage has increased sufficiently, the current regulating amplifier is disconnected and the voltage regulating amplifier is connected to the final amplifier stage, and the battery is charged at a lower rate required to maintain the voltage across the battery and the load substantially constant.

There is required for the operation of the regulating circuit employing the amplifying and current regulating space current devices a substantially constant direct voltage source and a substantially constant alternating voltage source. For supplying the direct voltage there is provided an auxiliary full wave rectifier to which alternating current is supplied from a supply line through a transformer, the secondary winding of which is connected through a series resistor to the input terminals of the rectifier. A gas-filled, cold cathode tube is connected across the output terminals of the rectifier to maintain the output voltage nearly constant but rising slightly with increasing supply line voltage. The voltage across the input of the rectifier, therefore, is also nearly constant but slightly rising with increasing line voltage, the larger portion of the voltage changes which occur across the secondary transformer winding appearing across the resistor which is connected in series with the rectifier input. A substantially constant alternating voltage is derived by supplying current from a portion of the secondary transformer winding through the series resistor to the primary winding of a second transformer, the portion of the secondary transformer winding of the first transformer which is used for this purpose being such that alternating voltage changes across it are substantially equal to the alternating voltage changes appearing across the resistor. The voltage changes across the transformer portion and across the resistor thus balance each other and the voltage across the second transformer is therefore substantially constant.

Figure 2:
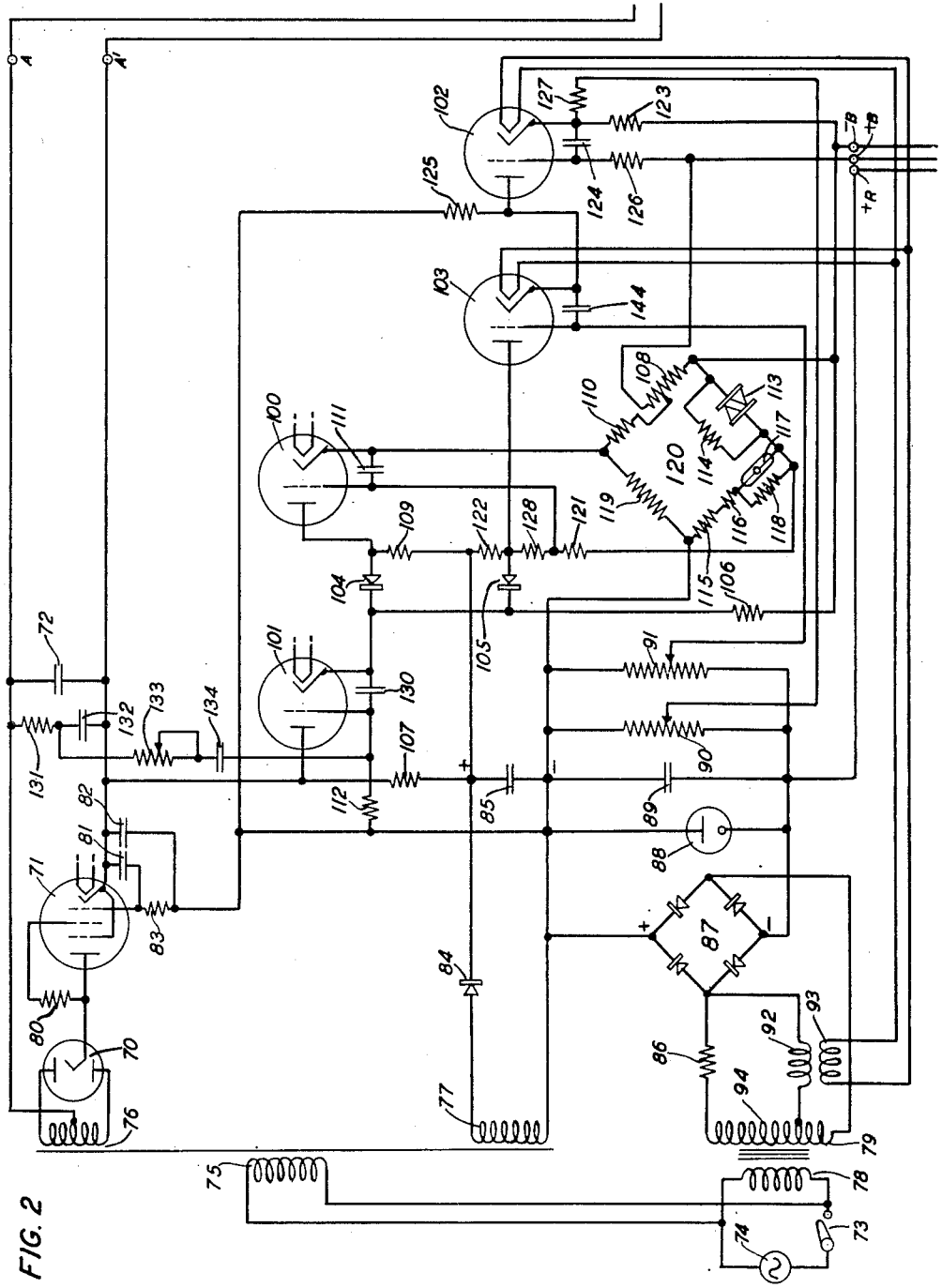
Figure 3:
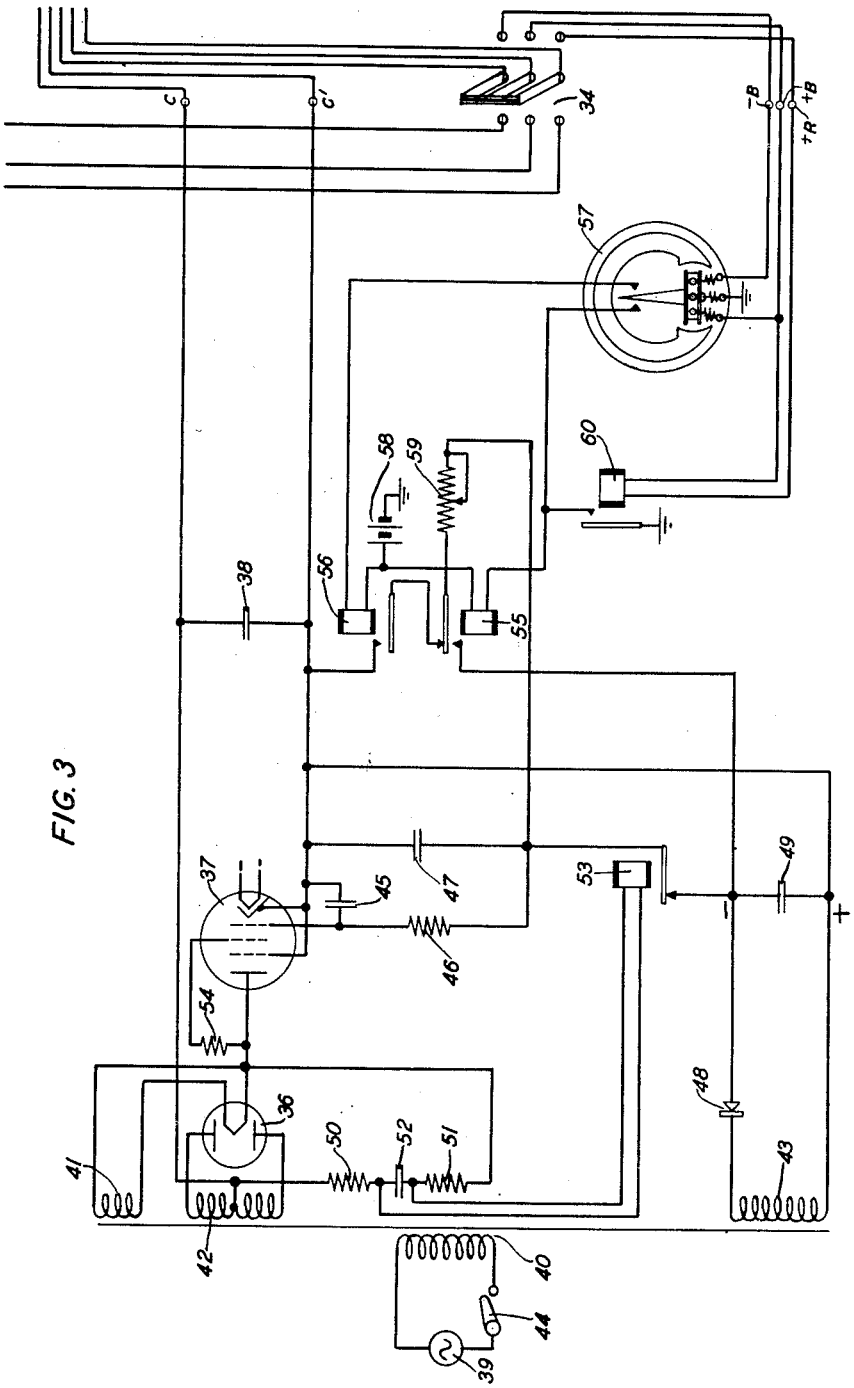

The invention will now be described in greater detail with reference to the accompanying drawing, Figs. 1 to 3 of which when placed as shown in Fig. 4 are a schematic view of a regulated rectifier embodying the invention.

Referring to the drawing, a three-phase bridge rectifier comprising selenium rectifier elements 10 is provided for supplying charging current to a battery 11 across which is connected a load 12 which may vary. Current from the three-phase alternating current supply source 13 is supplied to the rectifier 10 through transformers having primary windings 14, 15 and 16, respectively, and delta-connected secondary windings 17, 18 and 19, respectively. There are provided three saturable reactors having alternating current windings 20, 21 and 22, respectively. Reactor 20 has saturating windings 23 and 26, reactor 21 has saturating windings 24 and 27 and reactor 22 has saturating windings 25 and 28. Three current paths are delta-connected to the three-phase current source 13. The one path comprises transformer winding 14 and reactor winding 20 in series, the second path comprises transformer winding 15 and reactor winding 21 in series and the third path comprises transformer winding 16 and reactor winding 22 in series. The output current of the rectifier 10 flows through a circuit comprising in series a resistor 29, battery 11, inductance elements 30 and 31 of a ripple filter which also comprises shunt condensers 32 and 33 and through the saturating windings 23, 24 and 25 connected in parallel. An increase of the rectified current supplied by rectifier 10 to its load and flowing through saturating windings 23, 24 and 25 lowers the reactance of reactor windings 20, 21 and 22, thereby preventing or minimizing a rise of voltage drop across reactor windings 20, 21 and 22 due to increased current flowing therethrough. Switching means, not shown, are preferably provided for disconnecting the battery 11 and its load from the circuit of rectifier 10 when the power source 13 fails or is disconnected from the transformer primary circuit 14, 15, 16. This switching means may be a relay having a winding connected across resistor 29 and is provided for the purpose of preventing the flow of discharge current from battery 11 through the reverse resistance of the rectifier elements 10.

Two control circuits are provided for alternatively controlling the current supplied to saturating windings 26, 27 and 28 to control the reactances of the saturable reactors and thereby to control the alternating voltage impressed upon the rectifier 10, the direct current supplied by the rectifier to its load including the battery 11 and the load voltage. When switches 34 and 35 are closed to the right, as viewed in the drawing, current is supplied to saturating windings 26, 27 and 28 from an auxiliary rectifier comprising a rectifier tube 36 through the space current path of a series regulating tube 37, a filtering condenser 38 being connected across this supply circuit. This control circuit is energized, when switch 44 is closed, by current supplied to it from alternating current source 39 by way of a transformer having a primary winding 40 and secondary windings 41, 42 and 43. Heating current for the filamentary cathode of tube 36 is supplied from transformer winding 41. The end terminals of transformer winding 42 are connected to the anodes, respectively, of tube 36 and a mid-terminal of winding 42 is connected to the negative output terminal C of the auxiliary supply circuit. The cathode of rectifier tube 36 is connected directly to the anode of series tube 37 and through a resistor 54 to the screen grid of tube 37, the cathode of tube 37 being connected to the positive output terminal C'. A 0.006-microfarad condenser 45 directly connects the control grid-cathode circuit of tube 37 and a circuit comprising in series 2200-ohm resistor 46 and 16-microfarad condenser 47 also connects the control grid and cathode of tube 37.

Transformer winding 43 supplies current which is rectified by rectifier element 48 to 4-microfarad condenser 49 for charging it. The rectifier comprising tube 36 also supplies current to a circuit comprising 16,000-ohm resistors 50 and 51 and 4-microfarad condenser 52 all in series. The terminals of condenser 52 are connected to the winding of a starting relay 53. When switch 44 is closed to start the energization of the control circuit, the rectifier circuit comprising rectifier element 48 supplies charging current for condenser 47 through the closed contacts of relay 53. The charging of condenser 47 causes to be impressed upon the control grid of tube 37 with respect to its cathode a negative biasing potential for increasing the resistance of the space current path of series tube 37. The current which is supplied from rectifier 36 is thus limited to a low amplitude during an initial starting period while the cathode of tube 36 is being heated to operating temperature, thereby preventing damage to the cathode of tube 36. When the cathode of rectifier tube 36 has been heated sufficiently, energizing current is supplied to the winding of relay 53 to cause it to operate and thereby open the charging circuit for condenser 47.

There are provided relays 55 and 56 for controlling the charge on condenser 47 and thereby the current supplied to the saturating windings 26, 27 and 28. A voltmeter relay 57, the armature of which is connected to ground, has its actuating winding connected to the terminals +B and −B of battery 11. When the voltage of battery 11 is below a certain minimum value, the voltmeter relay closes a circuit for energizing the winding of relay 56 by current from battery 58 the negative terminal of which is grounded. Relay 56 when operated completes a circuit for slowly discharging condenser 47 through an adjustable resistor 59, the time constant of this discharge circuit being of the order of several minutes. The current supplied to the saturating windings 26, 27 and 28 and, therefore, the current supplied from rectifier 10 to battery 11, is gradually increased as the condenser 47 discharges. When the battery voltage has increased sufficiently, the voltmeter relay 57 opens the energizing circuit for relay 56. The current supplied to the saturating windings will then remain nearly constant and battery 11 will be charged at a nearly constant rate determined by the charge on condenser 47 which leaks off at a very slow rate. If, subsequently, the voltage of battery 11 exceeds a certain maximum, the voltmeter relay 57 will complete an energizing circuit for relay 55 which in turn completes a charging circuit from transformer winding 43 and rectifying element 48 through resistor 59 to condenser 47. The charge on condenser 47 thus gradually increases to cause a reduction of the energizing current supplied to saturating windings 26, 27 and 28 and therefore a reduction of the charging rate of battery 11. Should the current supplied by rectifier 10 to the battery 11 and load 12 become too high, the overload relay 60 will operate to cause the completion of an energizing circuit for relay 55, the operation of which causes the current supplied from rectifier 10 to be reduced. The winding of relay 60 is connected to terminals +B and +R so that the relay winding has impressed upon it the voltage drop across resistor 29 which is in series with the charging circuit of battery 11.

When switches 34 and 35 are closed to the left, as viewed in the drawing, the saturating windings 26, 27 and 28 in series are supplied with current from a rectifier comprising a rectifier tube 70 through the space current path of a series regulating space current tube 71, a filtering condenser 72 being connected across the supply leads going to terminals A and A'. When switch 73 is closed, current from an alternating current source 74 is supplied to the primary winding 75 of a transformer having secondary windings 76 and 77 and to the primary winding 78 of a transformer having a secondary winding 79. The end terminals of transformer winding 76 are connected to the anodes, respectively, of tube 70 and a mid-tap of this winding is connected to the negative output terminal A of the regulated rectifier. The cathode of tube 70 is directly connected to the anode of regulator tube 71 and through a resistor 80 to the screen grid of the regulator tube, the cathode of the tube 71 being connected to the positive output terminal A' of the regulated rectifier. A 0.006-microfarad condenser 81 is provided in a path directly connecting the control grid and cathode of tube 71 and a second path connecting the control grid and cathode of this tube comprises in series a 0.05-microfarad condenser 82 and a 2200-ohm resistor 83. Transformer winding 77 supplies current through a rectifying element 84 to a 4-microfarad condenser 85 for charging it, thereby providing an auxiliary source of direct voltage across condenser 85.

Alternating current is supplied from the secondary transformer winding 79 through a resistor 86 to the input terminals of a bridge rectifier 87 the output terminals of which are connected across a load circuit comprising in parallel a gas-filled, cold cathode tube 88, a filter condenser 89, a potentiometer 90 and a second potentiometer 91. The tube 88 has the characteristic that the resistance of its space current path decreases as the current through it increases so as to maintain the voltage across its terminals nearly constant but rising slightly as the voltage of source 74 rises. Most of the voltage change which occurs across transformer winding 79 appears across resistor 86, the voltage across the input terminals of rectifier 87 changing relatively little in response to voltage changes across transformer winding 79. If, for example, the voltage across transformer winding 79 rises from 500 to 550 volts, the voltage across the input terminals of rectifier 87 may rise from 170 to 175 volts and the voltage drop across resistor 86 will rise from 330 to 375 volts, an increase of 45 volts. There is provided a transformer having a primary winding 92 and a secondary winding 93 for supplying current to the cathode heaters of space current devices as will be described below. The winding 92 is supplied with current from a portion 94 of transformer winding 79 through a circuit comprising resistor 86. The transformer portion 94 is selected so that the voltage across it is larger than the voltage drop across resistor 86 but which varies at the same rate as the voltage across resistor 86 with respect to voltage changes of the source 74. If, as assumed above, the voltage across resistor 86 changes from 330 to 375 volts, the voltage across transformer portion 94 will change from 450 to 495 volts. Therefore, the voltage across each of the windings of transformer 92, 93 will remain substantially constant, the voltage across the primary winding 92 being 120 volts.

There are provided an amplifier, called a voltage amplifier herein, comprising a single space current triode 100, a second amplifier, called a current amplifier herein, comprising two space current triodes 102 and 103, a final or output amplifier stage comprising a space current triode 101 and means comprising asymmetrical varistors 104 and 105, such as copper-oxide rectifying elements, for alternatively connecting the output of the voltage or current amplifiers to the input of the final amplifier stage. Varistors are described in an article by J. A. Becker in the July 1940 issue of "Bell Laboratories Record" on page 322 et seq. While triodes 100, 101, 102 and 103 are shown as individual tubes, a twin triode tube may be used instead of tubes 100 and 101 and a twin triode tube may be used instead of tubes 102 and 103, if desired. Cathode heating current is supplied to tubes 102 and 103 from transformer 92, 93 and tubes 71, 100 and 101 may be similarly supplied with heating current. The space current circuit for tube 101 may be traced from the cathode of the tube, through a resistor 106 to terminal —B going to the negative terminal of battery 11, from the positive battery terminal through resistor 29 to terminal +R going to the negative terminal of rectifier 87, from the positive terminal of rectifier 87 to the negative terminal of the rectifier comprising rectifier element 84 and from the positive terminal of rectifier 84 through resistor 107 to the anode of tube 101. Resistor 107 and condenser 85 across which the output voltage of rectifier 84 appears are connected in series in the control grid-cathode circuit of series regulator tube 71 so that the resistance of the space current path of this tube is controlled in response to changes of voltage drop across resistor 107.

A potentiometer 108 is connected across the terminals +B and —B going to battery 11. The space current circuit of tube 100 may be traced from the positive terminal of battery 11 through resistor 29 to the negative terminal of rectifier 87, from the positive terminal of rectifier 87 to the negative terminal of rectifier 84, from the positive terminal of rectifier 84 through resistor 109 to the anode of tube 100 and from the cathode of tube 100 through resistor 110 to the adjustable tap of potentiometer 108 and thence through a portion of potentiometer 108 to the negative terminal of battery 11. When the varistor 104 is in the conducting or low resistance state, the anode of tube 100 is effectively connected to the cathode of tube 101. A condenser 111 is provided in a path connecting the control grid and cathode of tube 100. The control grid of tube 101 is connected through a resistor 112 to the negative output terminal of rectifier 84 so that the difference of the voltage across condenser 85 and the voltage across resistor 109 is impressed upon the grid with respect to the cathode of tube 101. A filtering condenser 130 is provided in a path connecting the control grid and cathode of tube 101.

There is provided a bridge circuit 120 having resistor 110 and the larger portion of potentiometer 108 in one arm, a symmetrical varistor such as a silicon carbide varistor 113 shunted by resistor 114 in a second arm, resistors 115 and 116 and directly heated thermistor 117, all in series, in a third arm, the thermistor 117 being shunted by a resistor 118, and a resistor 119 in a fourth arm. The positive terminal of rectifier 87 is connected to one of the bridge terminals and the opposite terminal of the bridge is connected to the negative terminal —B of battery 11 so that there is connected across the two terminals the sum of the voltages of battery 11 and the output voltage of rectifier 87. The remaining bridge terminals are connected, respectively, to the cathode of tube 100 and through a resistor 121 to the control grid of tube 100. The voltage derived by the bridge circuit 120 and impressed upon the grid-cathode circuit of tube 100 is the sum of the voltage across resistor 110 and the voltage across a portion of potentiometer 108 in one arm of the bridge minus the voltage across varistor 113 in a second arm of the bridge. The voltage across resistor 110 may be about 22 volts, that across the portion of potentiometer 108 in the bridge circuit about 50 volts and that across varistor 113 about 70 volts, making the summation of these voltages about 2 volts, the grid of tube 100 being negative with respect to the cathode. As the voltage of battery 11 increases, the voltage across the bridge arm comprising resistor 110 and a portion of potentiometer 108 increases at a much higher rate than the rate of increase of voltage across the bridge arm including varistor 113, the resistance of varistor 113 decreasing as the current through it increases. The voltage across varistor 113 is substantially constant. It varies even less than the voltage across the output terminals of rectifier 87, the voltage changes appearing mainly across the resistor 115. Therefore, as the voltage of the battery 11 increases, the voltage across the output terminals of the bridge increases to make the control grid of tube 100 more negative with respect to its cathode. If the asymmetrically conducting varistor 104 is in the conducting state, the control grid of tube 101 relative to its cathode and the grid of tube 71 relative to its cathode will each become more negative to cause the current supplied to saturating windings 26, 27 and 28 of the saturable reactor to decrease and the current supplied by rectifier 10 to battery 11 to decrease, thereby minimizing the increase of battery voltage. The grid and cathode of tube 100 are connected by a second circuit which may be traced from the control grid through resistors 128 and 122 to the positive terminal of rectifier 84, from the negative terminal of rectifier 84 to the positive terminal of rectifier 87, from the negative terminal of rectifier 87 through resistor 29 to the positive terminal of battery 11 and from the negative terminal of battery 11 through potentiometer 108 and resistor 110 to the tube cathode. As will be explained below, when the current supplied from rectifier 10 to the battery 11 and its load increases, the current through resistor 122 decreases to cause the grid of tube 100 to become less negative with respect to its cathode. The result is to increase the voltage supplied to the rectifier 10 when the load on the rectifier is increased, thus compensating for load changes. The resistance of varistor 113 and therefore the voltage drop across it, tends to decrease with increasing ambient temperature. To compensate for the resistance-temperature characteristic of varistor 113, a suitable ambient temperature responsive resistance device is provided in another arm of the bridge. For example, there is provided in the adjacent bridge arm, as shown, a directly heated thermistor 117, shunted by resistor 118, and a series resistor 116. When the ambient temperature rises, for example, the resistance of thermistor 117 decreases to cause the current through varistor 113 to rise and thereby minimize the effect of ambient temperature changes on the voltage drop across varistor 113. Thermistors are described in an article by G. L.

Pearson in "Bell Laboratories Record" for December 1940 page 106 et seq.

Resistor 131 and condenser 132 in series form a resistance-capacity filter connected across the leads going to terminals A, A'. There is provided a current path comprising variable resistor 133, condenser 134 and resistor 112 connected in the grid-cathode circuit of tube 71, this path being in parallel with respect to the current path comprising resistor 107 and the output terminals of rectifier 84 across condenser 85. The path 133, 134, 112 is an anti-hunting or negative feedback path coupling the output and input circuits of tube 101. If the control grid of tube 101 is made more negative with respect to its cathode, for example, the voltage drop across resistor 107 will decrease and current will flow in a circuit from the positive terminal of rectifier 84 through resistor 107, condenser 132, resistor 133, condenser 134 and resistor 112, all in series, to the negative output terminal of rectifier 84 to change the charge on condensers in the circuit. The transient voltage set up across resistor 112, as a result, is in a direction to oppose the potential change on the grid of tube 101 and the duration of the transient is determined by the time constant of the resistance-capacity circuit. The time constant of the circuit may be varied by adjusting the variable resistor 133 to make the speed of response of the regulator system to changes of current supplied by rectifier 10 as high as possible while avoiding the setting up of oscillations in the system or hunting.

The space current circuit for amplifier tube 103 may be traced from the positive terminal of battery 11 through resistor 29 to the negative terminal of rectifier 87, from the positive terminal of rectifier 87 to the negative terminal of rectifier 84, from the positive terminal of rectifier 84 through resistor 122 to the anode of tube 103, from the cathode of this tube to the anode of tube 102 and from the cathode of tube 102 through resistor 123 to the negative terminal of battery 11. A condenser 144 is in a path connecting the control grid and cathode of tube 102. The anode current circuit of tube 102 may be traced from the positive terminal of battery 11 through resistor 29 to the negative terminal of rectifier 87 from the positive terminal of rectifier 87 through resistor 125 to the anode of tube 102 and from the cathode of tube 102 through resistor 123 to the negative terminal of battery 11. The control grid-cathode circuit of tube 102 may be traced from the grid through resistor 126 to terminal +B, through resistor 29, through a portion of potentiometer 90 and through resistor 127 to the cathode of the tube. Thus voltage variations across resistor 29 which are proportional to amplitude variations of the current supplied from rectifier 10 to the battery 11 and its load 12 are impressed upon the grid-cathode circuit of tube 102 to control the space current of the tube flowing through resistor 125. The resistor 125 and a portion of potentiometer 91 are in the control grid-cathode circuit of tube 103 so that voltage variations across resistor 125 cause the space current of tube 103 flowing through resistor 122 to change. When varistor 105 is in the conducting state, the anode of tube 103 is effectively connected to the cathode of tube 101 so that a voltage equal to the difference of the voltage across resistor 122 and the voltage of rectifier 84 set up across condenser 85 is impressed upon the grid-cathode circuit of tube 101. When the current amplifier comprising tubes 102 and 103 is effective, that is when varistor 105 is in the conducting state, if the current supplied by rectifier 10 to battery 11 and its load should rise, for example, the voltage drop across resistor 29 will rise to make the grid of tube 102 more negative with respect to its cathode. As a result the grids of tubes 103, 101 and 71 each become more negative with respect to their respective cathodes to cause the current supplied to saturating windings 26, 27 and 28 to decrease and the rise of current supplied by rectifier 10 to the circuit of battery 11 is thus minimized. The battery charging current supplied by rectifier 10 may thus be maintained substantially constant at an amplitude which may be changed by adjusting the potentiometer 90. Resistors 110 and 119 are also connected in a circuit connecting the control grid and cathode of tube 102, this circuit including resistors 126 and 127. If the battery voltage is increased, while the current amplifier is effective, the voltage drop across resistors 110 and 119 will decrease to make the control grid of tube 102 less negative with respect to its cathode. The voltage supplied to the rectifier 10 is thus increased to compensate for the increased battery voltage.

It will be noted that the control grid-cathode circuit of tube 101 comprises in series resistor 112, the source of biasing voltage appearing across condenser 85 and two parallel branch paths one of which comprises resistor 109 and varistor 104 in series and the other of which comprises resistor 122 and varistor 105 in series. When the current supplied by rectifier 10 to the battery circuit is less than a predetermined maximum amplitude, the space current of tube 103 flowing through resistor 122 will be larger than the space current of tube 100 flowing through resistor 109. For this condition the voltage drop across resistor 122 will be larger than the voltage drop across resistor 109 and the difference voltage will cause current to flow in the local circuit comprising resistors 122 and 109 and varistors 104 and 105 all in series. This current flow in the local circuit will be in the low resistance direction of varistor 104 and in the high resistance direction of varistor 105. The voltage drop across varistor 104 being small compared with that across resistor 109, the voltage variations appearing across the resistor 109, rather than the variations across resistor 122, are effective in controlling the space current of tube 101. Under this condition, then, the charging rate of battery 11 is controlled to minimize battery voltage changes. However, if due to an increase of load, for example, the current supplied by rectifier 10 to the battery circuit should increase to the predetermined maximum amplitude, the space current of tube 103 flowing through resistor 122 will decrease to such an extent that the voltage drop across resistor 109 is greater than the voltage drop across resistor 122. In this case current will flow in the local circuit formed by the two parallel branch paths in the low resistance direction of varistor 105 and in the high resistance direction of varistor 104. Therefore the voltage variations appearing across resistor 122 are effective in controlling the space current of tube 101. Under this condition substantially constant current is supplied by rectifier 10 to the battery 11 and its load as determined by the settings of potentiometers 90 and 91.

What is claimed is:

1. In combination, a transformer having a primary winding to which current may be supplied from an alternating current supply source and a secondary winding, a full wave rectifier for rectifying alternating current supplied thereto and for supplying the rectified current from its output to a direct current load circuit, means for supplying alternating current from said secondary winding through a series resistor to said rectifier, means connected across said direct current load circuit at the output of said rectifier having a characteristic that its resistance decreases as the current flowing through it increases so as to tend to maintain constant the voltage across said direct current load circuit, an alternating current load circuit and means for supplying alternating current from a portion of said secondary winding through said resistor to said alternating current load circuit, thereby maintaining substantially constant the voltage across said alternating current load circuit.

2. A combination in accordance with claim 1 in which said portion of said secondary winding is such that the voltage across it is larger than the voltage across said resistor and that the rate of change of voltage across said portion with respect to supply voltage change is substantially equal to the rate of change of voltage across said resistor with respect to supply voltage change over the operating range of supply voltage variation.

3. In combination with means for supplying current from a current supply source to a load, of a space current device having an anode, a cathode and a control electrode, means for connecting the anode-cathode path of said device in series with said load with respect to said source, a current path comprising a condenser connecting said control electrode and said cathode, a resistor, a source of direct current, a first switching means for completing a charging circuit for said condenser, said circuit comprising said condenser, said resistor and said direct current source all in series, a second switching means for completing a discharging circuit for said condenser, said discharging circuit comprising said condenser and said resistor in series, means for operating said first switching means for causing the current supplied to the load to decrease and means for operating the second switching means for causing the current supplied to the load to increase, the current supplied to the load being maintained relatively steady under control of the voltage across the condenser during relatively long periods when neither switching means is operative.

4. In combination, a saturable reactor having an alternating current winding and a saturating winding to which direct current may be supplied for controlling the reactance of said alternating current winding, a space current device having an anode, a cathode and a control electrode, a direct current source, means for supplying current from said direct current source to said saturating winding through the anode-cathode path of said space current device, a current path comprising a condenser connecting said control electrode and said cathode, a source of charging current for said condenser, relay means responsive to energizing current supplied thereto for completing a circuit for charging said condenser by current from said source of charging current and a second relay means responsive to energizing current supplied thereto for alternatively completing a discharge circuit for said condenser only when said first relay means is unenergized, thereby controlling the reactance of said saturable reactor.

5. In combination, a rectifier for rectifying current supplied thereto and for supplying the rectified current to a load, a saturable reactor having an alternating current winding and a saturating winding for controlling the reactance of the alternating current winding under control of current supplied to the saturating winding, means for supplying current from an alternating current source to said rectifier through a circuit comprising said alternating current winding, a space current device comprising an anode, a cathode and a control electrode, means for supplying direct current to said saturating winding through the anode-cathode path of said space current device, a condenser in a path connecting said control electrode and said cathode, a source of charging current for said condenser, and means for controlling the amplitude of the rectified current supplied to said load comprising a first means for causing the completion of a circuit for charging said condenser by current from said source of charging current, a second means for causing the completion of a circuit for discharging said condenser and means responsive to the energization of said load circuit for controlling said first and second means.

6. The combination with a space current device having electrodes comprising an anode and a thermionic cathode of a rectifier for converting alternating current into direct current, a resistor, a first transformer having a primary winding adapted to be connected to a source of alternating current and a secondary winding, means for supplying current from said secondary winding through said resistor and through said rectifier in series to the space current path separating said anode in said cathode, a second transformer having a primary and a secondary winding, a current path connected across a portion of the secondary winding of said first transformer comprising in series said resistor and the primary winding of said second transformer and means for supplying heating current for said thermionic cathode from the secondary winding of said second transformer.

7. In combination, a main rectifier for rectifying alternating current supplied thereto from an alternating-current supply source and for supplying the rectified current to said load, variable impedance means for controlling the alternating current supplied from said source to said rectifier, an auxiliary rectifier for rectifying alternating current from said supply source, a first space current device having an anode, a cathode and a control electrode, means for supplying rectified current from said auxiliary rectifier through the space current path of said first space current device to said variable impedance means to control its impedance, means comprising a second, a third and a fourth space current device each having an anode, a cathode and a control electrode, a space current circuit for each of said second, third and fourth space current devices, two parallel branch paths, one of said branch paths comprising in series a portion of the space current circuit of said second space current device and a first asymmetrically conducting device, the second of said branch paths comprising in series a portion of the space current path of said third space current device and a second asymmetrically conducting device, means for impressing upon a circuit connecting the control electrode and cathode of said second space current device a voltage for causing the current in its space current path to vary in accordance with load voltage changes, means for impressing upon a circuit connecting the control electrode and cathode of said third space current device a voltage for causing the current in its space current path to vary in accordance with load current changes, a circuit connecting the control electrode and cathode of said fourth space current device including said two parallel branch paths and means for deriving from the space current path of said fourth space current device and impressing upon the control electrode with respect to the cathode of said first space current device a potential for controlling the resistance of the space current path of said first space current device.

8. In combination, a rectifier for rectifying current supplied thereto from an alternating-current supply source and for supplying the rectified current to a load, a saturable reactor having a core and on said core an alternating-current winding the reactance of which may be controlled for controlling the current supplied from said source to said rectifier, said reactor having on said core two saturating windings to which direct currents are supplied for setting up aiding unidirectional magnetomotive forces in said core, means for connecting one of said saturating windings in series with said load so that the rectified load current flows through said saturating winding, an auxiliary rectifier for rectifying current from said supply source, a space current device having a space current path and control means for controlling the resistance of said space current path, means for supplying current from said auxiliary rectifier through said space current path to the second saturating winding, space current amplifying means for setting up a unidirectional voltage having variations corresponding to load voltage changes when the load current is less than a certain value and having variations corresponding to load current changes when the load current has an amplitude greater than said certain value, and means for impressing said unidirectional voltage upon said control means to control the resistance of said space current path.

9. In combination, a first and a second space current device having a first and a second space current path, respectively, a first and a second resistor, means for supplying current to said first space current path through said first resistor to set up a first unidirectional voltage across said first resistor, means for supplying current to said second space current path through said second resistor to set up a second unidirectional voltage across said second resistor, means for supplying current from a current source to a load, means responsive to the voltage across said load for controlling the resistance of said first space current path to thereby control said first unidirectional voltage, means responsive to the current supplied to the load for controlling the resistance of said second space current path to thereby control said second unidirectional voltage, and means responsive to that one only of said first and second unidirectional voltages which differs in amplitude from the other of said first and second unidirectional voltages in a predetermined sense for controlling the supply of current to the load.

10. In combination, a three-phase rectifier for rectifying alternating current supplied thereto and for supplying the rectified current to a load, three transformers having primary windings connected to a supply source of three-phase alternating current and secondary windings connected to said rectifier, three saturable reactors each having an alternating current winding and a first and a second saturating winding, means for connecting said first saturating windings in parallel, means for connecting said parallel connected first saturating windings in series with the load so that an increase of load current reduces the reactance of said alternating current windings, means for connecting said alternating current windings of said saturable reactors in series with said primary transformer windings respectively, an auxiliary rectifier for rectifying current from an alternating current supply source to set up a direct voltage across its output terminals, a space current device having an anode, a cathode and a control electrode, means for connecting the anode-cathode path of said space current device and said second saturating windings of said saturable reactors all in series to said output terminals of said auxiliary rectifier, and means responsive to the voltage across said load for impressing upon the control electrode with respect to the cathode of said space current device a potential for decreasing the resistance of the space current path of said space current device in response to a decrease of said low voltage and vice versa, thereby controlling the reactance of said saturable reactors to cause load voltage changes to be minimized.

11. A combination in accordance with claim 10 in which there are provided a condenser, a resistor, a direct voltage source, means responsive to a load voltage change in one sense for completing a circuit for supplying current from said direct voltage source through said resistor to said condenser, means responsive to a load voltage change in the opposite direction for completing a circuit for discharging said condenser through said resistor, and means for impressing the voltage to which said condenser is charged upon the control electrode and cathode of said space current device to control the resistance of its space current path.

JAMES A. POTTER.

REFERENCES CITED

The following references are of record in the file of this patent:

UNITED STATES PATENTS

| Number | Name | Date |
|---|---|---|
| 1,650,072 | Jonas et al. | Nov. 22, 1927 |
| 1,865,562 | Gilson | July 5, 1932 |
| 1,965,439 | Stoller | July 3, 1934 |
| 2,005,892 | Gulliksen | June 25, 1935 |
| 2,018,348 | Dijksterhuis | Oct. 22, 1935 |
| 2,019,352 | Livingston | Oct. 29, 1935 |
| 2,020,961 | Quarles | Nov. 12, 1935 |
| 2,074,552 | Logan | Mar. 23, 1937 |
| 2,079,500 | Foos | May 4, 1937 |
| 2,084,870 | Schmidt | June 22, 1937 |
| 2,179,299 | Murcek | Nov. 7, 1939 |
| 2,306,998 | Claesson | Dec. 29, 1942 |
| 2,322,130 | Hedding | June 15, 1943 |
| 2,377,363 | Noble | June 5, 1945 |
| 2,386,548 | Fogel | Oct. 9, 1945 |
| 2,401,096 | Paradise et al. | May 28, 1946 |
| 2,486,154 | Hadfield | Oct. 25, 1949 |
| 2,501,263 | Cherry | Mar. 21, 1950 |
| 2,503,880 | Mah | Apr. 11, 1950 |